United States Patent [19]

Barry et al.

[11] Patent Number: 4,767,125
[45] Date of Patent: Aug. 30, 1988

[54] EXPANSION CHUCK

[75] Inventors: Denis E. Barry, Worthington; Jerry J. Miller, Whitehall, both of Ohio

[73] Assignee: Owens-Illinois Television Products Inc., Toledo, Ohio

[21] Appl. No.: 878,545

[22] Filed: Jun. 25, 1986

[51] Int. Cl.4 ............................................. B23B 31/40
[52] U.S. Cl. .................... 279/2 R; 242/72 R; 269/48.1
[58] Field of Search ............... 279/2 R; 269/47, 48, 269/48.1; 228/44.5, 45; 242/72 B, 72 R; 65/272

[56] References Cited

U.S. PATENT DOCUMENTS

| 2,499,781 | 3/1950 | Rothenberger | 279/2 R |
|---|---|---|---|
| 3,330,021 | 7/1967 | Jacobsen | 279/2 R |
| 3,599,997 | 8/1971 | Oliver | 279/2 R |
| 4,168,073 | 9/1979 | La Rue | 279/2 R |
| 4,198,066 | 4/1980 | Deprez et al. | 279/2 R |
| 4,534,116 | 8/1985 | Davis | 279/2 R |

FOREIGN PATENT DOCUMENTS

| 1261100 | 1/1972 | United Kingdom | 279/2 R |
|---|---|---|---|
| 1191237 | 11/1985 | U.S.S.R. | 228/44.5 |

Primary Examiner—Z. R. Bilinsky

[57] ABSTRACT

A chuck for grasping the internal cylindrical surface of a glass tube. An elongate tubular support structure with two sets of circumferentially spaced fingers or inserts that move radially outward under the influence of axial movement of a centrally positioned actuating member. The inserts are biased radially inward under the influence of spring members that contact each set of inserts. Movement of the centrally positioned actuating member causes one set of fingers or inserts to move radially outward into contact with the internal surface of a glass tube before the other set of inserts moves into contact with the internal surface of the glass tube.

7 Claims, 1 Drawing Sheet

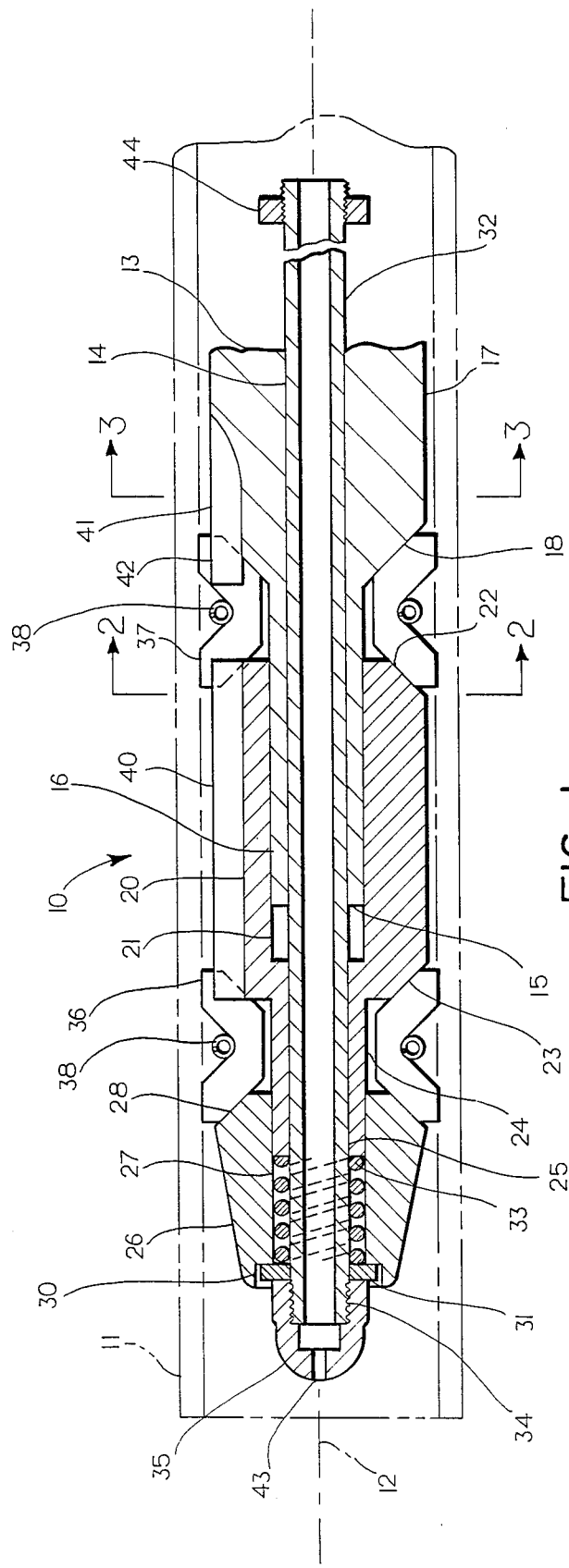
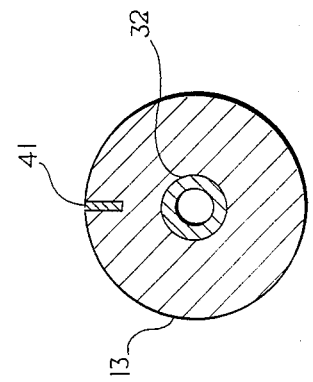
FIG. 3
FIG. 2
FIG. 1

EXPANSION CHUCK

BACKGROUND OF THE INVENTION

In the manufacture of glass envelopes for cathode ray tubes such as those utilized in television viewing sets, the glass envelope or bulb is manufactured in separate parts which are then united together by various processes. The viewing area or faceplate is manufactured in a press and contains a flanged edge that facilitates its attachment to the large end central portion of the bulb which is known as the funnel. The smaller end of the funnel is attached to a cylindrical glass tube known as the neck.

The glass neck tube is attached to the small end of the glass funnel by actually melting the respective ends of the glass as the parts are held in close proximity to one another. During the fusion process, the glass funnel and neck tube must be held in precise axial alignment consequently various holding devices or lathes are employed to provide the necessary alignment. In addition to providing the axial alignment, the lathe arrangement permits the glass parts to be rotated simultaneously so that a heat source can be evenly applied to the joint to be welded or fused together.

As the welding process commences, it is important that the end of the glass neck tube be in contact with the mating edge of the glass funnel because a small space or gap can cause a defective weld. A common defect is a small hole in the weld area which of course cannot be tolerated since the cathode ray tube depends upon an internal vacuum for successful operation.

The present invention minimizes the task of achieving proper alignment of the glass parts prior to and during the joining together or welding process. Thus rapid assembly techniques can be employed on a production line basis to produce vacuum tight welds.

SUMMARY OF THE INVENTION

This invention relates to an internal clutch device for firmly grasping the internal surface of a tubular member such as a cathode ray tube neck component. More particularly, the invention relates to a chucking device wherein one set of cam actuated fingers or inserts contacts the internal surface of the tubular member before the second set of cam actuated inserts moves radially outward and into engagement against the internal surface of the tubular member. Both sets of circumferentially spaced inserts are caused to move radially outward under the influence of a single movable axially positioned actuating member.

Since precise and repetitive alignment of tubular members such as glass tubes is one of the objects of the present invention, the sets of inserts are prevented from rotating with respect to one another and also with respect to the support structure.

Subsequent to the grasping function of the radially movable inserts, the axially aligned actuating member is returned to its original position by means of a compression spring. As the axially aligned actuating member moves toward its original position, the sets of fingers are biased radially inward under the influence of circumferentially positioned garter springs.

DESCRIPTION OF THE DRAWINGS

FIG. 1 is a sectional side view of the apparatus with some of the members being shown in section.

FIG. 2 is a view taken along lines 2—2 of FIG. 1 that shows the circumferential alignment of the radially movable inserts.

FIG. 3 is a view taken along lines 3—3 of FIG. 1 that shows a key member to prevent insert rotation.

DETAILED DESCRIPTION OF THE INVENTION

The overall device or apparatus is shown in FIG. 1 and is generally represented by the numeral 10. In order to better understand the invention and its function, a glass tube 11 is shown as its internal surface is grasped by chuck apparatus 10. The glass neck tube 11 and the apparatus are oriented along the central axis 12 as depicted in FIG. 1.

A support member 13 is shown in alignment with central axis 12. While support member 13 is shown broken in the right hand portion of FIG. 1, the support member 13 actually continues for some distance and is affixed in a rigid manner to a lathe mechanism which is not shown. Support member 13 contains an axially aligned bore 14 that traverses the length thereof. The support member 13 contains an integrally attached cylindrical end section 15 that shares bore 14. The external surface 16 of end section 15 is connected to the external surface 17 of support member 13 by conical cam surface 18.

A spacer 20, generally tubular in configuration, is telescoped over end section 15 so that the surface of bore 21 slides over external surface 16. Spacer 20 contains cam surface 22 as shown on the right hand side in FIG. 1 and a second cam surface 23 to the left of cam surface 22. Spacer 20 is somewhat similar in appearance to support member 13 in that spacer 20 also carries an integrally formed reduced diameter section 24 that extends to the left of cam surface 23 as can be seen in FIG. 1.

As previously pointed out, support member 13 carries an internal bore 14 throughout its axial extent. The same diameter bore also extends through reduced diameter section 24 of spacer 20. The bore 25 contained in section 24 communicates directly with bore 21 which passes through the main body portion of spacer 20.

A collet 26 is positioned so that its inside bore 27 slides in axial alignment over the external surface of reduced diameter section 24 of spacer 20. Collet 26 contains a cam surface 28 that has a conical surface that complements the cam surface 23 of spacer 20. A counterbore 30 is positioned in the left hand end of collet 26 as shown in FIG. 1. The counterbore 30 provides room for washer 31 which fits into counterbore 30 and abuts against collet 26.

An actuating member 32 that also serves as a purge tube is positioned axially through bore 14 of support member 13; the actuating member 32 is also aligned through the bore 25 contained in the reduced diameter section 24 of spacer 20. The actuating member 32 passes through the bore 27 of collet 26 but in spaced relationship to bore 27. A compression spring 33 is positioned over the left hand end of the actuating member 32 and fits into the recess provided between the bore 27 and external surface of the actuating member 32. One end of compression spring 33 rests against washer 31 and the opposite end of compression spring 33 coacts with the end of reduced diameter section 24 of spacer 20.

The left hand end of the actuating member 32 is threaded at 34. An acorn nut 35 is positioned on the threads at 34.

A first circumferentially aligned array of expansion inserts 36 is positioned so that the inserts 36 are in contact with cam surfaces 23 and 28. A second set of circumferentially aligned expansion inserts 37 is positioned to the right of inserts 36 and in a similar manner coacts with cam surfaces 18 and 22. Each set of inserts 36 and 37 contains six segments, however, the insert sets would function in an acceptable manner with another number of segments. Inserts 36 and 37 are confined to their circumferential arrays by means of compression or garter springs 38.

FIG. 2, which is a section taken along lines 2—2 of FIG. 1, illustrates more clearly the array of expansion inserts 37 and their spaced relationship with one another. FIG. 2 also shows key 40 that is press fitted into an axially extending groove that is milled in spacer 20. Key 40 has ends that are unconfined thus permitting the ends of key 40 to fit into the space between a pair of inserts in array 36 and also into the space between a pair of inserts in array 37.

FIG. 3, which is a section shown along lines 3—3 of FIG.1, shows a second key 41 that is press fit into a groove along an axial portion of support member 13. The key 41 has a cantilevered end 42 that fits in the space between two of the inserts in array 37.

OPERATION OF THE INVENTION

During the manufacture of glass bulbs for cathode ray tubes, it has been found quite practical to fabricate component parts of the glass bulb and then fuse or weld the components into a completed glass bulb. The present invention facilitates the welding together of the glass funnel and the glass neck tube which is familiar to those skilled in the art. The neck tube must be precisely aligned with the axis of the bulb because the neck tube contains the electron gun within its tubular interior and at least a portion of the electron deflection yoke coil on its outside surface. Then too, the neck tube to funnel weld must be gas impervious. To achieve the optimum weld, the glass parts must be in abutting relationship with one another since additional weld material is not relied upon, but rather, intensive heat melts a portion of the existing glass adjacent the weld thus causing the properly aligned glass parts to fuse together. If a small gap exists between the glass parts the weld may not be gas tight in that small blow holes may exist in the weld area, thus it is important that the glass parts be moved into proper alignment in a rapid manner and maintained in abutting relationship throughout the welding cycle.

At assembly, the glass neck tube 11 is positioned against the small end of a glass funnel (not shown). The chuck apparatus 10 is then inserted into the glass neck tube to hold the glass neck tube 11 in the proper no gap position. After insertion of the chuck apparatus 10, an axial force is applied to the actuating member 32 through nut 44 or other anchoring means attached to the right hand end of the actuating member 32. The axial movement of the actuating member 32 relative to and through the support member 13 causes compression spring 33 to exert a force against the left hand end of spacer 20. Spacer 20 moves to the right thus urging expansion inserts 37 radially outward until the inserts 37 contact the internal surface of the glass neck tube 11. As the actuating member 32 slides axially along reduced diameter section 24 of spacer 20, spring 33 is further compressed thus causing washer 31 to contact collet 26. As collet 26 moves toward the right, expansion inserts 36 are moved radially outward toward the internal surface of glass neck tube 11.

From the foregoing description, it becomes clear that expansion inserts 37 contact the internal surface of glass neck tube 11 slightly before the expansion inserts 36 do likewise. If the expansion inserts 36 arrived at the internal surface of the glass neck tube 11 before expansion inserts 37, there could be a slight movement of the glass neck tube 11 axially to the right, thus moving it away from the glass surface of the glass funnel to which it is to be welded. The close proximity of the glass parts to one another prior to and during the weld cycle prevents defective welds.

Heretofore, key 40 has been described as being press fitted into a groove in spacer 20 and likewise key 41 is immobilized in support member 13. Because of the two key arrangement, the expansion inserts 36,37 will always maintain their arcuate positions relative to one another. In other words, a drift in a circumferential direction is prevented. By maintaining the expansion inserts 36,37 in the same circumferential position, accurate repetitive holding of the respective neck tubes can be achieved. Then too, wear patterns on the overall chuck apparatus 10 can be checked from time to time.

The actuating member 32 has a dual role in that an expansion insert caming force is applied to apparatus 10 and the tubular nature of the actuating member32 permits the atmosphere of the interior of the glass bulb to be controlled during the weld cycle. It is possible that the heated gasses within the glass bulb can cause deformities or actual blow through conditions in the weld area where the molten glass flows quite readily. Complete egress of hot gasses can be accomplished via bore 43 in acorn nut 35 and the tubular extent through the actuating member 32.

The present invention provides a quick and reliable method of positioning a glass tube without incurring minute axial movement as the tube is clamped into welding position.

What is claimed is:

1. A chuck for grasping the interior of an elongate tube that has an axis of symmetry, said chuck including an actuating member positioned along the axial extent of said chuck, a support member that telescopes over at least a portion of said actuating member, a tubular spacer in telescopic arrangement with said actuating and said support members, an apertured collet positioned exteriorly of and in sliding arrangement with one end of said spacer, coupling means between the end of said actuating member and said collet, spring means positioned between the end of said actuating member and one end of said spacer, said collet, spacer, and support member each having cam surfaces thereon, a first circumferentially spaced array of segmented expansion inserts positioned around said spacer and in contact with the cam surfaces of said collet and said spacer, a second circumferentially spaced array of segmented expansion inserts positioned around said support member and in contact with the cam surfaces of said spacer and said support member, key means in contact with some of said inserts to prevent their rotation about the axis of the chuck, and resilient constriction means circumscribing each array of inserts to urge them in a radially inward direction.

2. An elongate chuck mechanism, with a longitudinal axis of symmetry, for grasping the interior of an elongate tube that has an axis of symmetry, said chuck including an actuating member positioned along the axial extent of said chuck, a support member that telescopes over at least a portion of said actuating member and is in sliding engagement therewith, a tubular spacer in sliding telescopic arrangement with said actuating and said support member, an apertured collet positioned exteriorly of and in sliding arrangment with and over one end of said spacer, coupling means at the end of the actuating member and engaging said collet, said actuating member movement controlling said collet movement axially along said spacer, spring means on the actuating means positioned between said coupling means and one end of said spacer urging the spacer axially in a direction away from the collet, said collet and support members each having cam surfaces thereon, said spacer having a plurality of cam surfaces thereon, a first circumferentially spaced array of expansion inserts comprised of plural segments positioned around said spacer and in sliding contact with the cam surfaces of said collet and said spacer, a second circumferentially spaced array of expansion inserts comprised of plural segments positioned around said support member and in contact with the cam surfaces of said spacer and said support member, key means in contact with some of said insert segments to prevent their rotation about the axis of the chuck, and constriction spring means circumscribing an exterior portion of each array of the insert segments to urge them in a radially inward direction.

3. A chuck mechanism as claimed in claim 2 wherein the coupling means connected to said actuating member is in the form of a washer and a nut.

4. A chuck mechanism as claimed in claim 3 wherein said nut contains an aperture therethrough.

5. A chuck mechanism as claimed in claim 2 wherein the cam surfaces are of conical configuration.

6. A chuck mechanism as claimed in claim 2 wherein the first and second expansion insert arrays each have at least three segmented pieces.

7. A chuck mechanism as claimed in claim 6 wherein said key means comprises; a first key anchored in said spacer with one end of said first key extending into one of the interstices of said first array of expansion inserts and the other end of said first key extending into one of the interstices of said second array of expansion inserts, a second key anchored in said support member and extending so that the cantilevered end thereof is positioned in one of the interstices of said second array of expansion inserts.

* * * * *